April 14, 1964   HEUNG-DUK DAN   3,128,975
PREVENTIVE DETECTOR CAR
Filed May 17, 1960
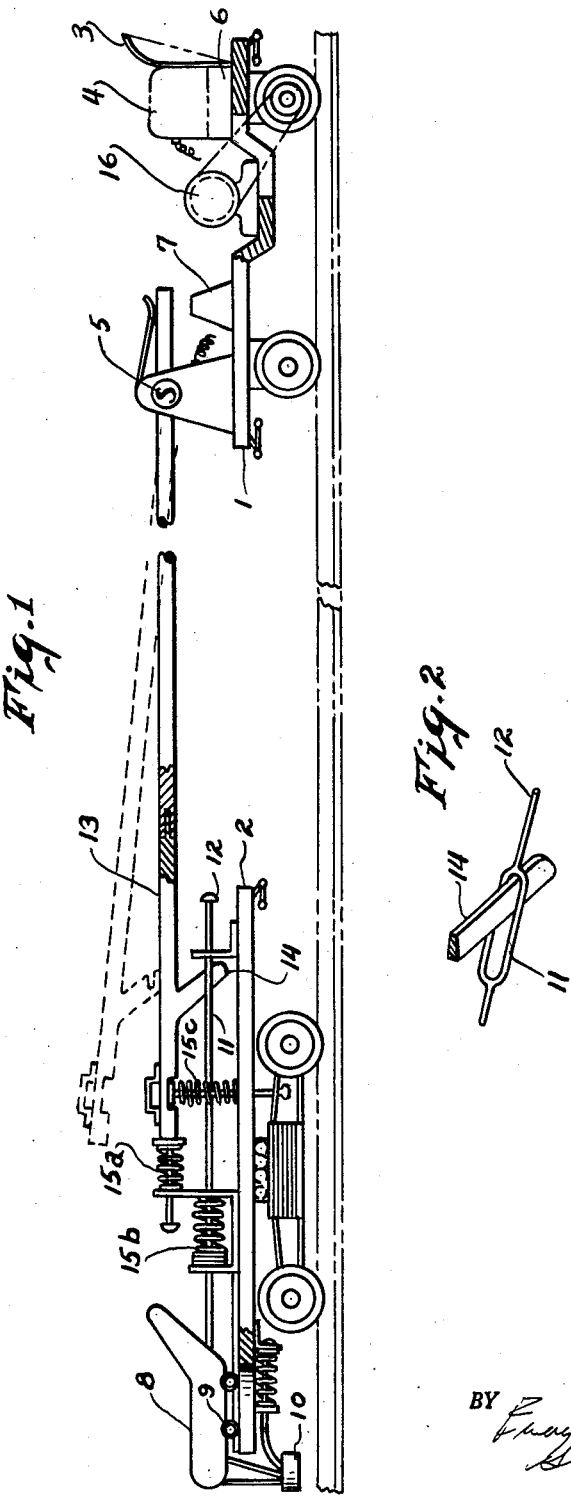
INVENTOR.
HEUNG-DUK DAN
BY
ATTORNEYS

United States Patent Office 3,128,975
Patented Apr. 14, 1964

3,128,975
PREVENTIVE DETECTOR CAR
Heung-Duk Dan, 35th Samchung-dong, Chong-no,
Seoul, Korea
Filed May 17, 1960, Ser. No. 29,660
2 Claims. (Cl. 246—121)

This invention relates to a remotely controlled car for railroads, and, more particularly, to a car remotely driven in front of a train for the detection of obstacles.

Train accidents are often caused by obstacles or track defects which cannot be observed at a sufficiently far distance to enable stopping of the train.

It is, therefore, the primary object of this invention to detect obstacles at a sufficient distance in advance of the train to allow stopping thereof.

In accordance with this object there is provided, in a referred embodiment of this invention, a detector assembly driven by remote control in front of a moving train. The detector comprises a driven car and a drive car. The drive car is provided with a motor and apparatus for remote control of the motor speed and direction of rotation from the train. A switch is provided which, when closed, transmits a danger signal to the train.

The driven car is coupled to the drive car through a coupling arm which serves to hold the switch open. When the driven car encounters an obstacle, the coupling is released to simultaneously close the switch, initiating the sending of the danger signal, and to stop the drive car.

Thus, the train engineer can drive the detector assembly forward, backward, can stop it and can control the speed of it by remote control, such as a wireless transmission. In such case a wireless transmitter and receiver must be installed in the engine of the train.

Thus the detector assembly runs ahead of the train keeping a proper distance (the gap is flexible through the remote control link) and the speed of it can be automatically controlled such as by a speed regulator of a tele-typewriter nature that if engine runs with the speed of 60 m.p.h. (A wave), this panel will indicate 60 (identical A wave) on its dial, thus sending A wave to the receiving equipment on the motor car. It the engine runs 70 m.p.h. (B wave), 80 m.p.h. (C wave), it will signal B and C wave respectively and accordingly.

This twin car, upon meeting any sort of obstacle or derailment, will instantly transmit a warning signal to engine, thus enabling the engineer to bring his train to a stop within the safe distance.

At the front part of the detector assembly the driven car is equipped with a movably mounted bumper assembly mounted on four rollers so that it can freely move forward and backward. The bumper assembly is urged into engagement with a hook on the coupling arm, the end of which is attached to the drive car. The arm is released by the bumper assembly when an obstacle is encountered to initiate the warning signal transmission to the train.

The details of the construction will be better understood by reference to the following detailed description and the accompanying drawings, of which:

FIG. 1 is a side elevation of the detector assembly; and

FIG. 2 is a perspective view of a portion of the apparatus shown in FIG. 1.

In the figures there is shown the detector assembly comprising a drive or motor car 1. The drive car is composed of antenna 3, the equipment of wireless transmission and receipt of messages 4, switch 5, battery 6, pad for the connecting rod 7 and motor 16.

The driven car 2 is composed of a bumper assembly 8 positioned to strike any obstacle. The bumper assembly is movably mounted on four rollers 9, and carries bumper 10, an iron rod which can move forward and backward 12, and three springs 15A, 15B, 15C.

The connecting rod or coupling arm 13 is provided with a hook-like extension 14. The arm is pivotally mounted on drive car 1 and connects the two cars to each other. Movement of the arm operates switch 5 to send a signal to the train.

By these constructions, the detector assembly travels ahead of the train. When the detector assembly is hindered by any obstacle or derailment, the driven car will stop instantly, the connecting rod will be disconnected from the driven car pivoting to operate the switch 5, and simultaneously sending a warning signal to the train and bringing the motor car to a stop.

Upon running into some obstacle the bumper 10 and bumper assembly is moved backward and likewise the iron rod 12 is pushed back, and then the elliptical ring 11 and the short hook-type part of the connecting iron rod 14 are disconnected. The driven car is then halted and the connecting rod 13 is pushed upward by the elasticity of the spring 15C, operating the switch 5 to simultaneously send a warning signal to the engine and to bring the motor car to a stop.

On the other hand, when derailed, the connecting rod 13 by the force from the motor car will push forward, overcoming the spring 15A, thus enabling the hook 14 to be disconnected from elliptical ring 11. The connecting rod 13 will be pushed upward by the elasticity of the spring 15C likewise as in above, sending signal to the engine and bringing the motor car to a stop at the same time.

The connecting rod length is selected to provide time for the drive car to stop safely, thus enabling the comparatively expensive car to avoid possible self-destruction crash by being directly exposed to the fast approaching obstacle or disastrous derailment.

Another good point of the connecting rod can be proved when it is a human that was hit by this twin car.

By being able to disconnect from the forerunning car, it instantly sets the car to a halt free of pushing force from the motor car, thus minimizing the possible damage on human being.

As for the switch 5, when it is operated, it transmits a warning signal instantly to engine, it kills off the motor and at the same time touches off the cellmotor which will in turn put in a brake of the motor car as a whole.

This invention may be variously modified and embodied within the scope of the subjoined claims.

What is claimed is:

1. A detector assembly adapted to be driven in front of a train on the same track at a physically remotely controlled distance, comprising a drive car, a driven car forward of said drive car, an arm, one end of said arm being pivotally mounted on said drive car, the other end of said arm being releasably coupled to said driven car, mean on said driven car responsive to impact of said driven car with an obstacle to release said arm from said driven car, and means responsive to movement of said arm after release to transmit a warning signal to said train.

2. A detector assembly in accordance with claim 1 in which said impact responsive means includes a bumper assembly movably mounted on said driven car, and in which said arm includes a hook engaging said bumper assembly, said assembly being urged into engagement with said arm and movable out of engagement therewith by impact.

(References on following page)

References Cited in the file of this patent

UNITED STATES PATENTS

| | | |
|---|---|---|
| 155,596 | Steudell | Oct. 6, 1874 |
| 280,046 | Knapp | June 26, 1883 |
| 386,403 | James | July 17, 1888 |
| 401,591 | Riesenberg | Apr. 16, 1899 |
| 2,509,331 | Brannen | May 30, 1950 |
| 2,702,342 | Korman | Feb. 15, 1955 |
| 2,948,234 | Hughson | Aug. 9, 1960 |

FOREIGN PATENTS

| | | |
|---|---|---|
| 25,865 of 1905 | Great Britain | Aug. 23, 1906 |